United States Patent
Krishnamurthy et al.

(10) Patent No.: US 8,732,295 B2
(45) Date of Patent: May 20, 2014

(54) METHOD AND APPARATUS FOR PROVIDING REAL FRIENDS COUNT

(75) Inventors: Balachander Krishnamurthy, New York, NY (US); Graham Cormode, Morristown, NJ (US); Kermit Hal Purdy, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 765 days.

(21) Appl. No.: 12/233,213

(22) Filed: Sep. 18, 2008

(65) Prior Publication Data

US 2009/0083418 A1    Mar. 26, 2009

Related U.S. Application Data

(60) Provisional application No. 60/974,335, filed on Sep. 21, 2007.

(51) Int. Cl.
*G06F 15/173*    (2006.01)

(52) U.S. Cl.
USPC .......................................... 709/224; 709/206

(58) Field of Classification Search
USPC ......... 709/204, 223, 206, 238, 224, 232, 216; 707/104.1; 715/530, 811; 705/319
See application file for complete search history.

(56) References Cited

U.S. PATENT DOCUMENTS

| | | | |
|---|---|---|---|
| 7,885,901 B2* | 2/2011 | Hull et al. | 705/319 |
| 2002/0124053 A1* | 9/2002 | Adams et al. | 709/216 |
| 2004/0003352 A1* | 1/2004 | Bargeron et al. | 715/530 |
| 2004/0199663 A1* | 10/2004 | Horvitz et al. | 709/238 |
| 2004/0254998 A1* | 12/2004 | Horvitz | 709/206 |
| 2005/0076060 A1* | 4/2005 | Finn et al. | 707/104.1 |
| 2005/0228899 A1* | 10/2005 | Wendkos et al. | 709/232 |
| 2006/0190536 A1* | 8/2006 | Strong et al. | 709/204 |
| 2007/0162547 A1* | 7/2007 | Ross | 709/204 |
| 2008/0005294 A1* | 1/2008 | Morris | 709/223 |
| 2008/0086528 A1* | 4/2008 | Garg et al. | 709/204 |
| 2008/0155471 A1* | 6/2008 | Lynn et al. | 715/811 |
| 2008/0176655 A1* | 7/2008 | James et al. | 463/42 |
| 2009/0006559 A1* | 1/2009 | Bhogal et al. | 709/206 |

* cited by examiner

*Primary Examiner* — Jungwon Chang

(57) ABSTRACT

A method and apparatus for tracking communications in a network are disclosed. For example, the method receives a subscription from a customer for a service to track at least one variable associated with a plurality of communicants of the customer. The method identifies a plurality of members of a social network of the customer, and gathers communication data associated with the plurality of members for tracking the at least one variable. The method then displays at least one result derived from the communication data to the customer.

16 Claims, 3 Drawing Sheets

METHOD AND APPARATUS FOR PROVIDING REAL FRIENDS COUNT

This application claims the benefit of U.S. Provisional Application No. 60/974,335 electronically filed on Sep. 21, 2007, which is herein incorporated by reference.

The present invention relates generally to communication networks and, more particularly, to a method and apparatus for collecting information about recent communicants in a social network setting, along with interesting statistics relating to the recent communicants, manipulating the collected information, and displaying the collected information as desired by a participant in a social network.

BACKGROUND OF THE INVENTION

Social networks are typically operated by one owner. For example, MySpace is a popular social network operated by a single enterprise. However, a third party "scraper" program may be unable to collect information about activities of the users of the social network. For example, the frequency of communication, volume of communication, type of communication among users of a social network cannot be measured by external devices.

SUMMARY OF THE INVENTION

In one embodiment, the present invention discloses a method and apparatus for tracking communications in a network. For example, the method receives a subscription from a customer for a service to track at least one variable associated with a plurality of communicants of the customer. The method identifies a plurality of members of a social network of the customer, and gathers communication data associated with the plurality of members for tracking the at least one variable. The method then displays at least one result derived from the communication data to the customer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a real friends count in networks. Although the present invention is discussed below in the context of Internet Protocol (IP) networks, the present invention is not so limited. Namely, the present invention can be applied for other types of packet networks and the like.

Figure 1:
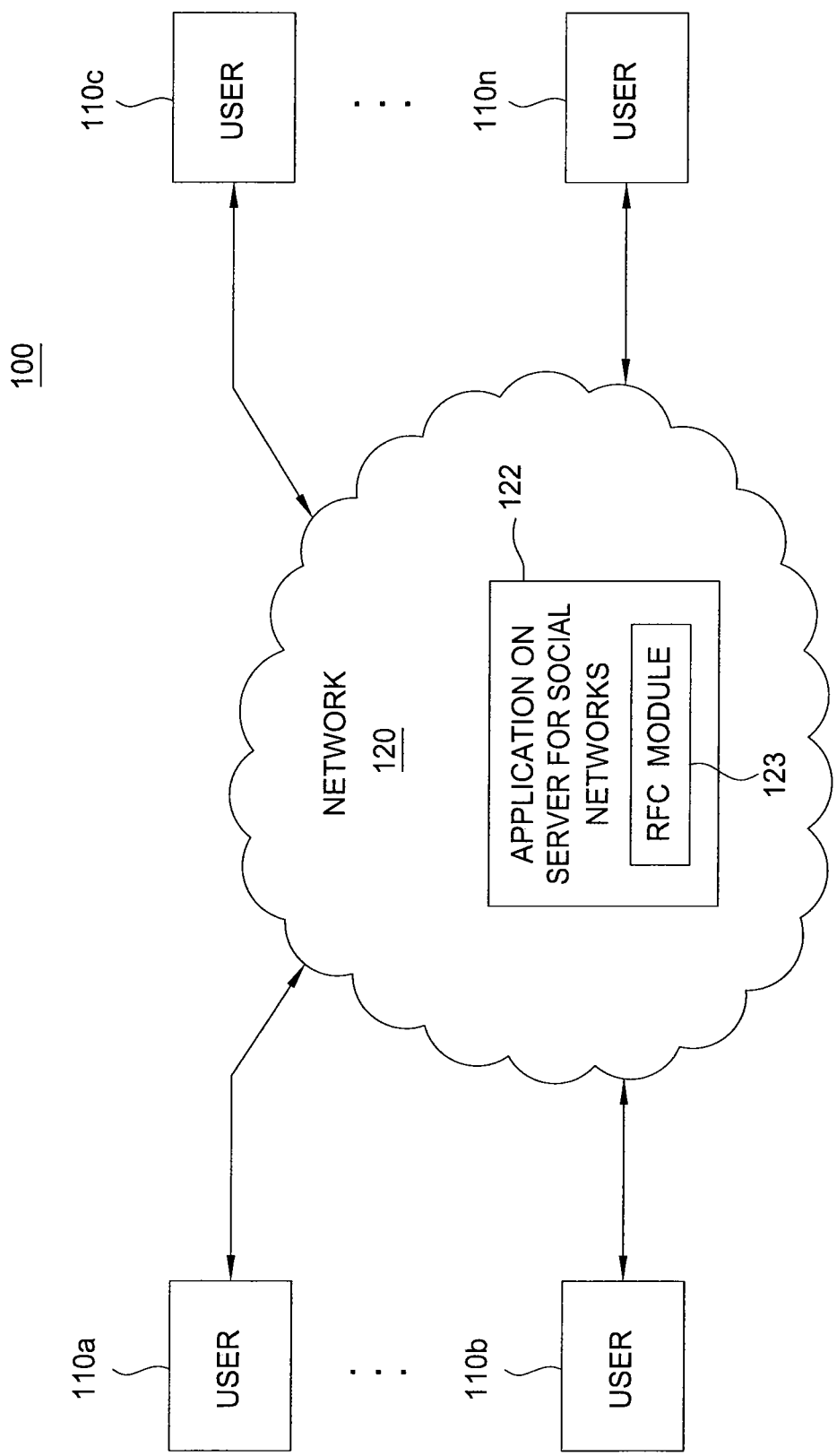
FIG. 1 illustrates an exemplary network related to the present invention.

FIG. 1 is a block diagram depicting an exemplary network 100 related to the current invention. A plurality of users $110_{a-n}$ are communicating with each other via a communications network 120. It should be noted that communication network 120 is not limited to a particular type of network. For example, communication network 120 may be implemented as a public network (e.g., the Internet) or a private network (e.g., a local area network). For example, the communication network 120 may broadly comprise: a packet network, a circuit-based network, a cellular or wireless network, an access network, a VoIP network, and the like. In turn, the users $110_{a-n}$ may utilize any number of endpoint devices to communicate with each other, e.g., a telephone, a VoIP telephone, a cellular telephone, a pager, a computer, a laptop, a personal digital assistant (PDA), and the like.

In one embodiment, a network service provider, e.g., a core network service provider, a cellular network service provider, an access network service provider, a local telephone network service provider, a cable network service provider, etc., may provide communication services via the network 120.

In one embodiment, the network service provider may implement a social networking service in an application server 122. Alternatively, a third party may provide a social networking service that a customer of the network service provider is able to access via the network service provider's network. The application server 122 is capable of defining a social network for a user, wherein the user is a customer of the network service provider. Although only one server is illustrated in FIG. 1, it should be noted that the social networking service can be implemented across any number of network devices.

In one embodiment, the network service provider may then maintain a database for a list of customers who subscriber to the social networking service, e.g., Facebook, MySpace, My YearBook (e.g., provided by third parties), and the like. The network service provider may define a social network for each customer of the social networking service. For example, the social networking service, e.g., MySpace, may have one million subscribers and a particular subscriber may communicate with twenty friends, family members, etc. over the social network. For example, a customer may share pictures with twenty friends over a service e.g., Facebook, MySpace, My YearBook, and the like. In this illustrative example, the twenty friends may then constitute the customer's social network.

It is important to note that participation in the social network is invoked by opting-in. For example, a customer who wishes to join MySpace would opt-in and provide a profile to the network service provider. The customer also provides the network service provider a list of users he/she wishes to be in his/her particular social network. Broadly, a customer's social network may be defined as one or more individuals, communicants, group of individuals, or group of communicants who exchange communications with the customer over a social networking service.

The customer's communication may be bi-directional or uni-directional. For example, if a customer sends a communication to another user without receiving a reply, the other user may be considered a communicant of the customer's social network. Those skilled in the art would also realize that the communication may be defined as any intra-site bi-directional or other related communication including but not limited to one or more of: a phone call, an email, a message, a notification, or writing on a shared social network bulletin board/wall.

In one embodiment, the method for providing the social network implemented in application server 122 may contain a module for a Real Friends Count (RFC) application 123 of the current invention. The RFC application in module 123 is an application that enables the network service provider to obtain local and global counts, lists of correspondents, etc. using a technique within the social network's Application Program Interface (API). Specifically, the RFC application may identify a group of individuals (broadly defined as communicants) as being within a customer's social network, based on one or more attributes of the communication(s) between each of the individuals and the customer. The one or more attributes of the communication may comprise: a type of communication (e.g., land line telephone calls, cell phone calls, instant messages, paging, emails, and the like), a length of time of a communication, a frequency of communication, a geography or location of a group of users, a type of service used in a communication, and the like.

In one embodiment, the present invention may include an analysis of the content of the communications. For example, a user may elect to consent to such analysis to be performed by a machine, i.e., without the content of the communications being viewed by a person. For example, an automated textual analysis of email messages sent from one person to another person may provide insights as to the particular type or classification of communication, e.g., distinguishing spam from a form letter message from an intimate message and so on. For example, the content analysis may generate or derive a "measure of intimacy" for each communication. The present invention is not limited to any particular content analysis tool.

The RFC application may then start the collection of data to be used to generate a list and count of communicants. For example, Application Program Interfaces (APIs) that are part of the social networking site may be used to gather data to be used to generate a list and count of communicants for customers who elect to use the RFC application. However, it should be noted that although using the published API on the part of the social network provider may assist in the implementation of the present invention, the present invention is not so limited. In another example, a spider program can be used for crawling the publicly accessible information on the social network.

For example, members of a social network may also subscribe to have their communication automatically tracked and/or analyzed. The RFC application may then start automatically tracking the list of communicants for the customers who subscribe for such tracking. For example, if the customer subscribes for an RFC tracking of his/her social network, e.g., Facebook, MySpace, My YearBook, and the like, the RFC application starts tracking the list and counts of communicants.

In one embodiment, the method may display the resulting list of communicants and count of communicants for a customer in a segmented chart. For example, one chart may show the counts of communicants, another chart may show frequency of communication with each communicant, and so on.

In one embodiment, the RFC application may display two sets of segmented charts, wherein one set of segmented charts are for outgoing communications and another set are for incoming communications. For example, the method may display counts of communicants for outgoing communication on one set of segmented charts, and display the equivalent information for incoming communication on another set of segmented charts.

In one embodiment, the method provides the segmented chart(s) with color codes, wherein the color codes signify the freshness of communication. For example, red may signify not-so-recent communication while green signifies a recent communication, and so on. In one embodiment, the segmented chart provides a degree of connectedness, e.g., a numerical value. It should be noted that the present invention is not limited to any particular method of displaying the data to the user.

The method may also perform statistical analysis on the gathered data related to the communicants and display the statistical results. In one embodiment, the customer may be able to get a measure of their connectedness, receive reminders about the lack of communication, receive an RFC metric with measurements (e.g., frequency of communication, last communication, etc.), and the like. For example, the method may provide a metric with a connectedness score between each customer and each of the customer's communicants. The method may also rank all communicants of the customer in an order of significance based on the connectedness score.

In one embodiment, the RFC application may generate and provide a global popularity list. For example, the RFC application may provide a dynamic ranking of users. For example, the method may compute a total score for the communication of the customer and provide a dynamic ranking within the global population of the users of the RFC application. For example, the ranking may show the global popularity list as a list of the top RFC counts. The method may then show the relative ranking of the specific customer in relation to other users of the RFC application.

In one embodiment, the network service provider or a third party may also gather and analyze anonymous information about users of the RFC application and their interconnections (broadly referred to as a global statistical analysis). For example, the network service provider may gather information, remove content that may be used to identify a specific user (e.g., user ID), and analyze the information. The analysis may be performed to determine how users interact with each other via the social network and to track how the interactions may vary over time. For example, the interactions around holiday times, during popular vacation times, etc. may be different.

Another reason for collecting the global information is to put an individual user's data in context. For example, one could imagine the system displaying information such as "You sent 13 messages yesterday, that is more than x % (e.g., 90%) of users" or similar. The global information is necessary to compare the user to the rest of the population, which may be of general interest to display such information.

In one embodiment, the RFC application may also enable customers to provide the results of the statistical analysis to their contacts. For example, a customer may show his/her RFC ranking to their friends, family, etc. In another example, a display of the customer's ranking may be accessible to the customer's communicants in a joint location, e.g., a shared bulletin board.

In one embodiment, the RFC application may also notify one or more recent communicants of the customer to accept a request to run the same application. Participation in running the same application is optional. For example, the network service provider may have incentives to have users of the RFC application to invite others to use the same application. Users may then share their experiences with their communicants to increase the usage of the RFC application.

In one embodiment, the RFC application may enable customers to prevent their recent communicants from receiving a request to run the RFC application. In one example, the RFC application may enable customers to opt out of having their communicants receive the requests to run the same application. In another example, an RFC customer may terminate running the application in order to prevent the customer's communicants from receiving an invitation to run the same (RFC) application.

In one embodiment, the RFC application may be invoked on a periodical basis. For example, a list of communicants and a display of connectedness may be provided on a weekly basis, monthly basis, etc. In one embodiment, the RFC application may be invoked automatically. For example, the RFC application may be invoked automatically on a monthly basis.

In one embodiment, the RFC application (e.g., broadly a software application) may be downloaded onto the customer's endpoint device. The RFC application may then run on the customer's device and provide the charts directly to the user without involvement of the network service provider (e.g., data gathering and statistical analysis can be performed locally at the endpoint device). In another embodiment, the RFC application may reside in a server managed by the social networking service provider. The server may then gather information and provide the charts to customers. For example, a customer may get a display of the chart by clicking on an RFC chart icon.

Figure 2:
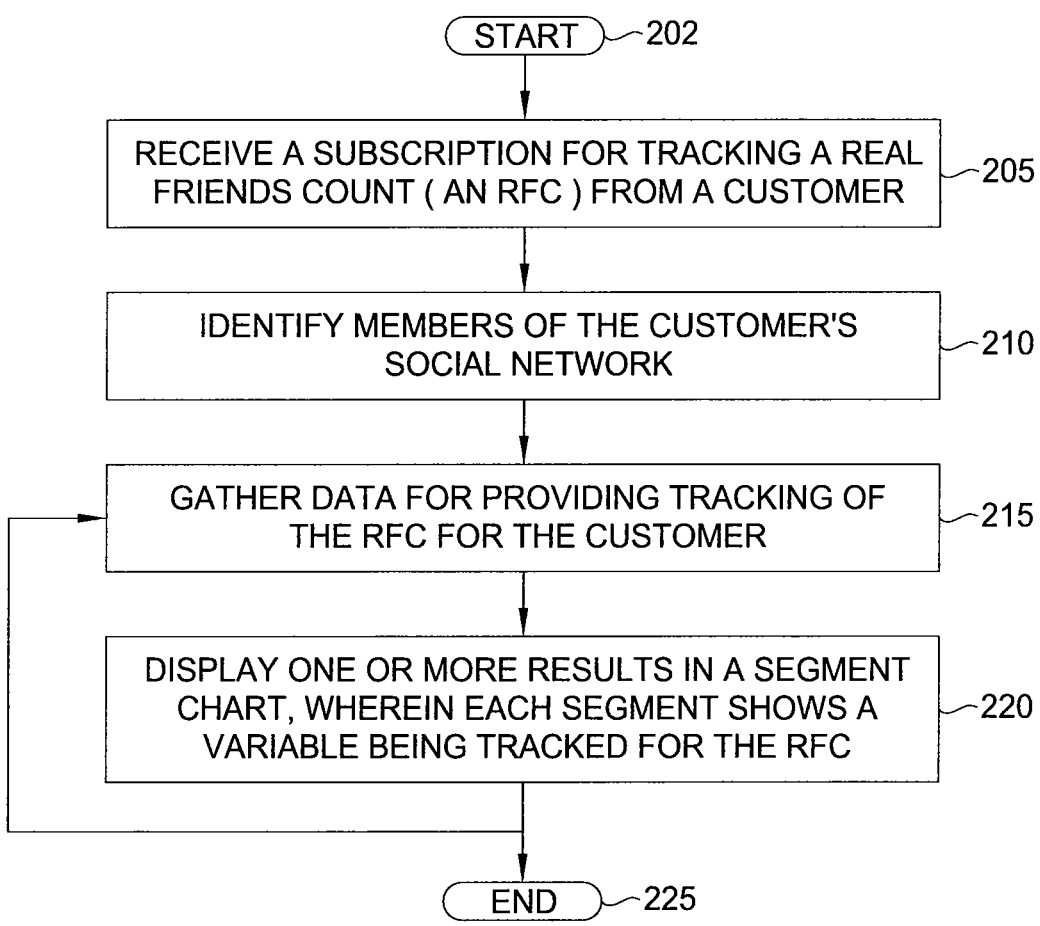
FIG. 2 illustrates a flowchart of a method for providing real friends count in a network.

FIG. 2 illustrates an exemplary flowchart of a method 200 for providing a Real Friends Count (RFC) in a network. For example, one or more steps of method 200 can be implemented by Application server 122. Method 200 starts in step 202 and proceeds to step 205.

In step 205, method 200 receives a subscription for a Real Friends Count (RFC) tracking from a customer. For example, a member of a social network, e.g., Facebook, MySpace, My YearBook, and the like may subscribe to an RFC tracking of his/her communications over a social network.

In step 210, method 200 identifies members of the customer's social network. For example, the customer may have provided the members of his/her social network during subscription of the service. In one embodiment, the customer may provide one or more attributes of the communication between the customer and members of the social network that can used to deduce who would be considered to be members of the customer's social network, instead of a specific list of members. For example, the customer may specify his/her social network to contain all individuals who exchange email with the customer, all individuals who exchange a certain number of emails (e.g., 5 emails, 10 emails and so on) with the customer for a given period of time (e.g., per day, per week and so on), all individuals who share a common bulletin board, all individuals who receive text messages, and so on. The method then determines the members of the customer's social network based on the provided attributes.

In step 215, method 200 gathers and stores communication data for providing the RFC tracking. For example, Application Program Interfaces (APIs) that are part of the social networking site may be used to gather data to be used to generate values for one or more variables being tracked. For example, the method may be tracking a list of communicants and counts of communicants for each customer.

In step 220, method 200 displays or outputs results in a segmented chart, wherein each segment shows a variable being tracked. For example, the method may display a list of communicants and count of communicants for the customer in a segmented chart. For example, one chart may show the counts of communicants, another chart may show frequency of communication with each communicant, and so on. The method ends in step 225 or returns to step 215 to continue gathering more data.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
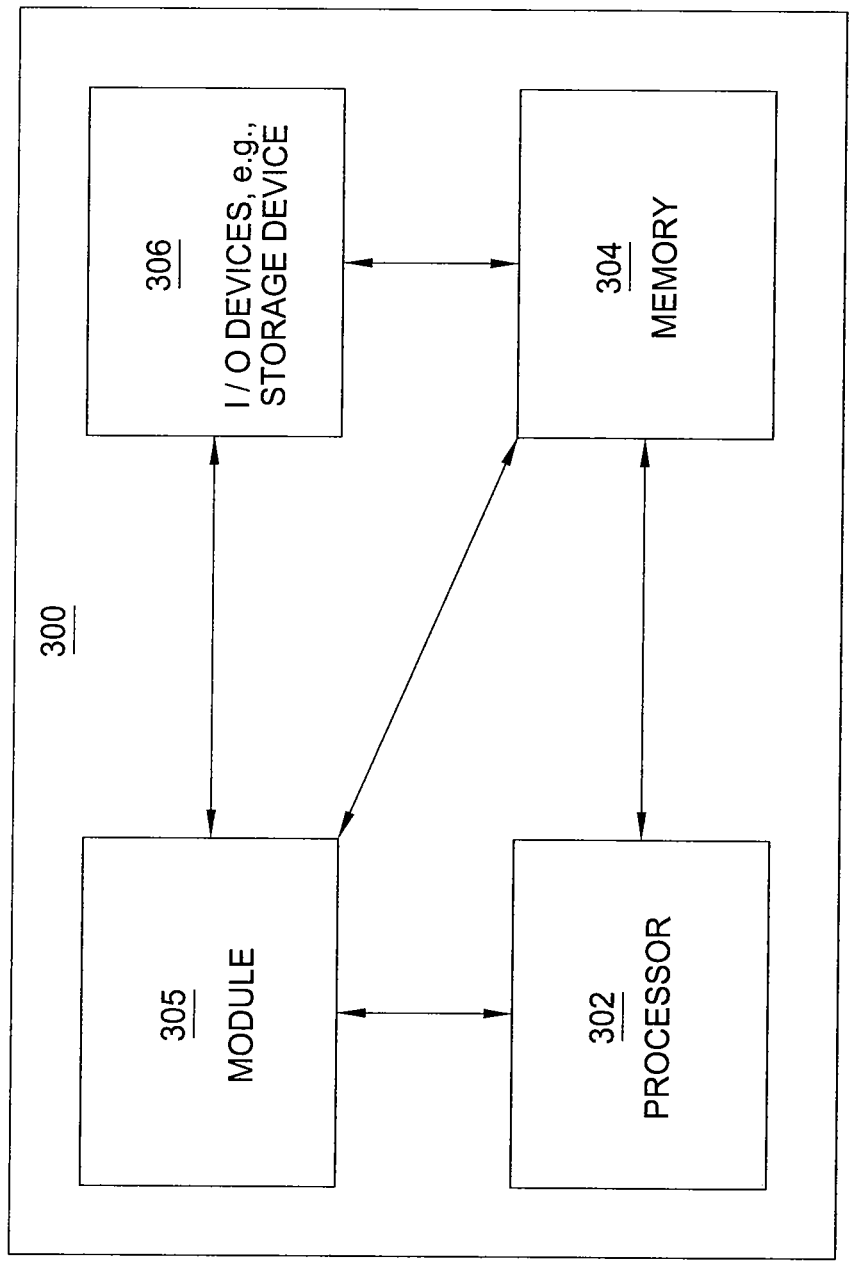
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a Real Friends Count (RFC) in a network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing a Real Friends Count (RFC) in a network can be loaded into memory 304 and executed by processor 302 to implement the functions as discussed above. As such, the present method 305 for providing a Real Friends Count (RFC) in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracking communications in a network, comprising:
 receiving, via a processor, a subscription from a customer for a service to track at least one communication variable of communications between the customer and each of a plurality of communicants of the customer, wherein the communication variable comprises a frequency of communication with each communicant of the plurality of communicants of the customer;
 identifying, via the processor, a plurality of members of a social network of the customer from the plurality of communicants, wherein the plurality of members of the social network of the customer comprises a fewer number of members as compared to a number of members of the plurality of communicants;
 gathering, via the processor, communication data associated with the plurality of members for tracking the at least one communication variable;
 performing, via the processor, a statistical analysis on the communication data; and
 displaying, via the processor, a result derived from the communication data to the customer, wherein the displaying the result displays the result of the statistical analysis, wherein the statistical analysis provides a measure of connectedness, wherein a reminder about a lack of communication is provided to the customer in accordance with the measure of connectedness.

2. The method of claim 1, wherein the at least one communication variable comprises a plurality of communication variables, wherein the displaying displays the result in a chart comprising a plurality of segments, wherein each segment of the plurality of segments displays one of the plurality of communication variables being tracked.

3. The method of claim 2, wherein each segment of the plurality of segments in the chart is provided with color codes, wherein a color of the color codes signifies a freshness of communication.

4. The method of claim 1, further comprising:
enabling the customer to provide the result of the statistical analysis to a member of the plurality of members of the social network.

5. The method of claim 1, further comprising:
generating a global popularity list from the result of the statistical analysis.

6. The method of claim 1, further comprising:
performing a global statistical analysis by a network service provider anonymously for a plurality of customers of the network service provider for tracking interactions associated with the plurality of customers.

7. The method of claim 1, further comprising:
notifying a member of the plurality of members of the social network of the customer to accept an invitation to subscribe to the service.

8. The method of claim 1, further comprising:
downloading a software application for the service to an endpoint device of the customer, wherein the communication data is gathered locally at the endpoint device.

9. The method of claim 1, wherein the displaying is invoked on a periodical basis.

10. The method of claim 1, wherein the at least one communication variable comprises a first communication variable for tracking outgoing communications and a second communication variable for tracking incoming communications.

11. A non-transitory computer-readable medium storing a plurality of instructions which, when executed by a processor, cause the processor to perform operations for tracking communications in a network, the operations comprising:
receiving a subscription from a customer for a service to track at least one communication variable of communications between the customer and each of a plurality of communicants of the customer, wherein the communication variable comprises a frequency of communication with each communicant of the plurality of communicants of the customer;
identifying a plurality of members of a social network of the customer from the plurality of communicants, wherein the plurality of members of the social network of the customer comprises a fewer number of members as compared to a number of members of the plurality of communicants;
gathering communication data associated with the plurality of members for tracking the at least one communication variable;
performing a statistical analysis on the communication data; and
displaying a result derived from the communication data to the customer, wherein the displaying the result displays the result of the statistical analysis, wherein the statistical analysis provides a measure of connectedness, wherein a reminder about a lack of communication is provided to the customer in accordance with the measure of connectedness.

12. The non-transitory computer-readable medium of claim 11, wherein the at least one communication variable comprises a plurality of communication variables, wherein the displaying displays the result in a chart comprising a plurality of segments, wherein each segment of the plurality of segments displays one of the plurality of communication variables being tracked.

13. The non-transitory computer-readable medium of claim 11, further comprising:
enabling the customer to provide the result of the statistical analysis to a member of the plurality of members of the social network.

14. The non-transitory computer-readable medium of claim 11, further comprising:
generating a global popularity list from the result of the statistical analysis.

15. The non-transitory computer-readable medium of claim 11, further comprising:
performing a global statistical analysis by a network service provider anonymously for a plurality of customers of the network service provider for tracking interactions associated with the plurality of customers.

16. An apparatus for tracking communications in a network, comprising:
a processor; and
a computer-readable memory storing a plurality of instructions which, when executed by the processor, cause the processor to perform operations, the operations comprising:
receiving a subscription from a customer for a service to track at least one communication variable of communications between the customer and each of a plurality of communicants of the customer, wherein the communication variable comprises a frequency of communication with each communicant of the plurality of communicants of the customer;
identifying a plurality of members of a social network of the customer from the plurality of communicants, wherein the plurality of members of the social network of the customer comprises a fewer number of members as compared to a number of members of the plurality of communicants;
gathering communication data associated with the plurality of members for tracking the at least one communication variable; and
performing a statistical analysis on the communication data; and displaying a result derived from the communication data to the customer, wherein the displaying the result displays the result of the statistical analysis, wherein the statistical analysis provides a measure of connectedness, wherein a reminder about a lack of communication is provided to the customer in accordance with the measure of connectedness.

* * * * *